C. CHRISTIAN.
HAND CORN SHELLER.
No. 75,368.            Patented Mar. 10, 1868.
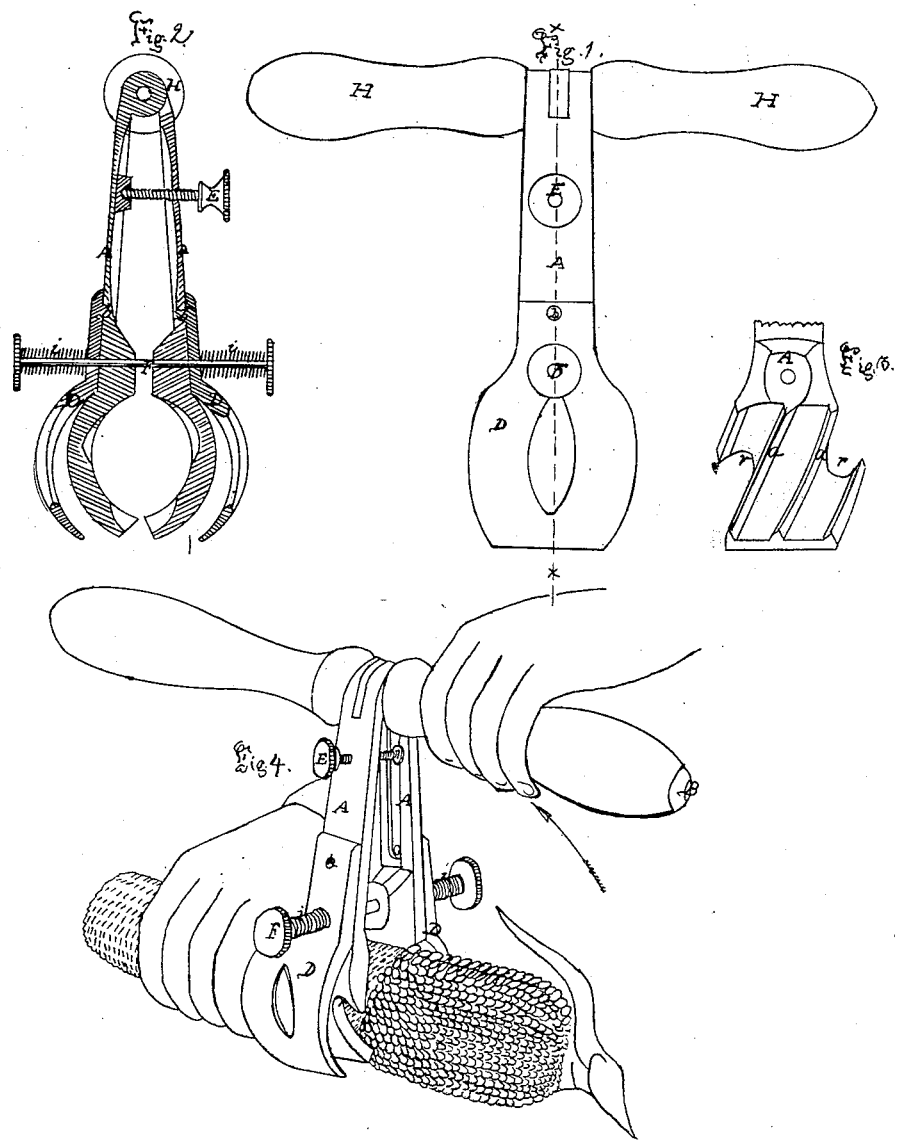

United States Patent Office.

CHARLES CHRISTIAN, OF MILWAUKEE, WISCONSIN.

Letters Patent No. 75,368, dated March 10, 1868.

IMPROVEMENT IN HAND CORN-SHELLERS.

The Schedule referred to in these Letters Patent and making part of the same.

TO ALL WHOM IT MAY CONCERN:

Be it known that I, CHARLES CHRISTIAN, of Milwaukee, in the county of Milwaukee, and State of Wisconsin, have invented a new and useful Improvement in Hand Corn-Shellers; and I do hereby declare the following to be a full, clear, and exact description of the same, reference being had to the accompanying drawings, in which—

Figure 1 represents a plan view of my invention.

Figure 2, a longitudinal section on line $x\ x$.

Figure 3, the inner surface of the jaw and screw-thread thereon; and

Figure 4, the manner of using.

My invention relates to an improvement in hand corn-shellers, and consists, first, in attaching guards to prevent the scattering of the corn in shelling; and, second, in a set-screw to adapt the sheller to different sizes of ears of corn.

It is constructed and operated as shown in the figures, and in order that others may understand the same, I will proceed to particularly describe it.

The corn-sheller, figs. 1 and 2, consists of two pieces of iron or other metal A A, made in the form shown, and are hinged together by a rod, B, passing through the ends, and the handles H H. From the handles these pieces are straight for about four inches, when they increase in width and are curved in the manner shown at fig. 2. On the inside surfaces of these circular portions are two or three raised screw-threads $a\ a$, fig. 3, of suitable pitch to retain and draw in the ear of corn when its small end shall have been placed within the opening. Upon the outside of these curved portions, and a little distance from them, are placed the guards D D, to prevent the corn from being scattered too much in the process of shelling. These guards are made of metal, and with a curved form, to surround in part the curved portions A A. They are somewhat larger and project over the sides A A, so that the corn will strike against them instead of being thrown about the room. These guards are held in position by the rod F passing them and the pieces A A. This rod F projects some distance beyond the guards D, and has on each end heads which retain upon the rod the spiral springs $i\ i$. There is also inserted in the end near the handles a pin, $b$, which projects from the under side into a corresponding hole in the pieces A A, thereby preventing any lateral displacement of the guards. The spiral springs $i\ i$ serve to keep the jaws of the sheller in close contact with the ear of corn, so that when they are turned around, the corn will be quickly and easily removed from the cob, and that the threads $a\ a$, on the inside of the jaws, may "take" in the cob, and thus be caused to advance on the same until it shall have been passed through. There is also a set-screw, E, near the handles, which is used to set the jaws A A wider apart when it may be desired, as is the case when the ears of corn are very large.

The manner of using this sheller is very simple, and is plainly shown at fig. 4. Taking hold of either handle with either hand, the ear of corn is placed between the jaws, and, by turning them around, the screw-threads operate against the cob, and one or the other of the recessed edges $r\ r$ strip the kernels from the cob according as the ear is entered at one side or the other of the sheller.

Having thus described my invention, its construction and mode of operation, what I claim as new, is—

In combination with the hand corn-sheller A A, the curved guard-plates D D, substantially as and for the purpose set forth.

In combination with the hand corn-sheller A A the set-screw E, substantially as and for the purpose set forth.

A hand corn-sheller, constructed with the plates A A, as described, and provided with the guard-plates D D, springs $i\ i$, and set-screw E, substantially as and for the purpose set forth.

CHAS. CHRISTIAN.

Witnesses:
T. C. JOHN, M. D.,
JOHN ROSENTHAL.